April 2, 1940.  H. J. CRINER  2,195,641
BREAD SLICING MACHINE
Original Filed Nov. 6, 1937
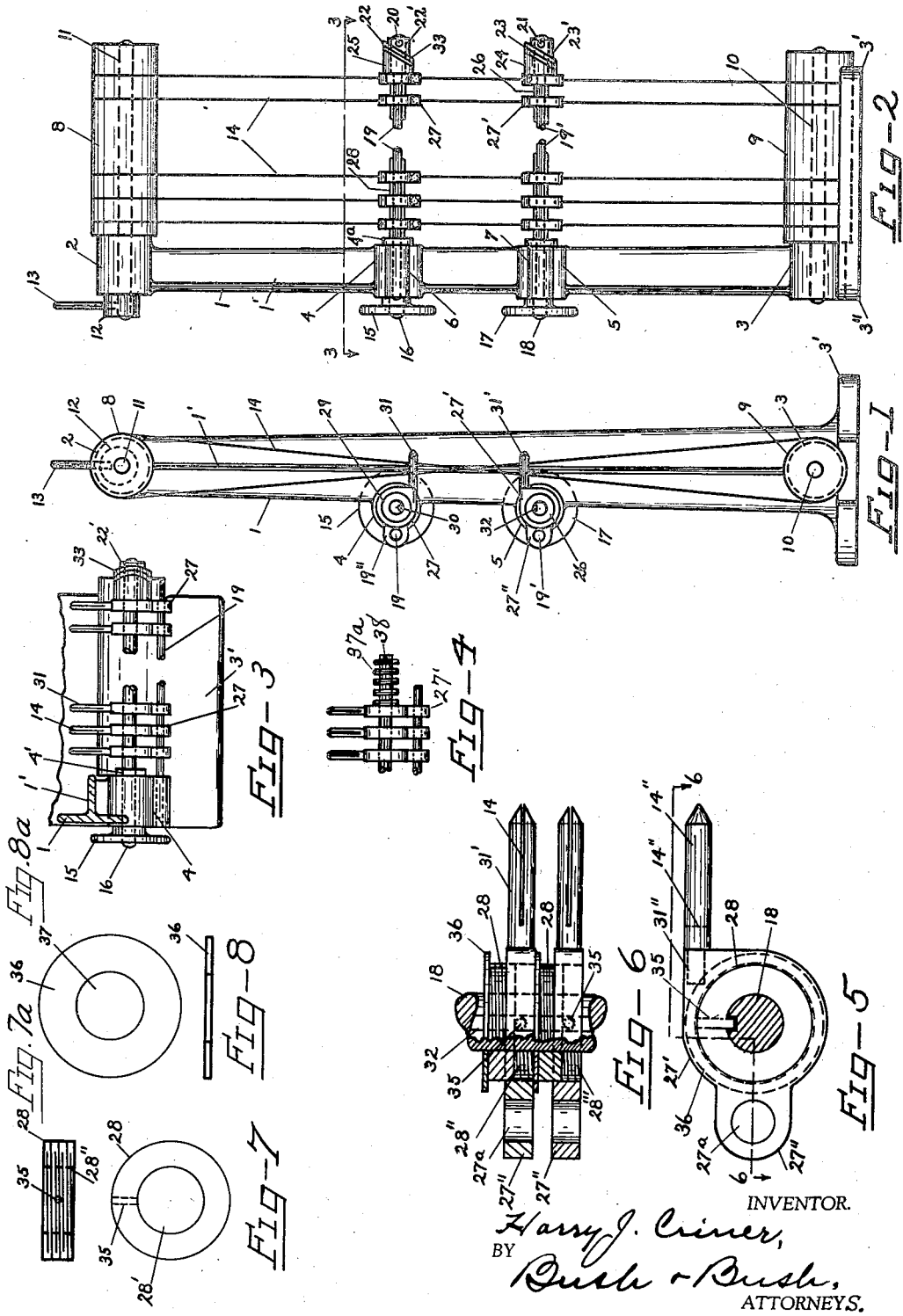
INVENTOR.
Harry J. Criner,
BY Bush & Bush,
ATTORNEYS.

Patented Apr. 2, 1940

2,195,641

UNITED STATES PATENT OFFICE 2,195,641

BREAD SLICING MACHINE

Harry J. Criner, Davenport, Iowa, assignor of one-half to A. G. Bush, Davenport, Iowa Original application November 6, 1937, Serial No. 173,134. Divided and this application February 13, 1939, Serial No. 256,052

20 Claims. (Cl. 146—88)

This application is a divisional application to cover certain features shown but not claimed in my Patent No. 2,150,426 dated March 14, 1939, for Bread slicing machine, and co-pending herewith.

My invention is applicable to bread slicing machines of the endless band-blade type having a plurality of band-blades having spaced parallel cutting courses and also to a band-blade slicing machine utilizing a single band-blade reeved about the pulleys in Figure 8 form and having a plurality of spaced parallel cutting courses.

The objects of my invention are to provide means by which the spacing of a plurality of such cutting courses may be changed uniformly by means which will not only adjust the spacing of the blades through their cutting courses, but which will also act to space the portions of the blades in contact with the spaced pulleys.

Also to provide a spacing mechanism which will be positive and which will cause the spacing members to move simultaneously as well as uniformly and avoid any danger of injury to the blades from coming in contact with each other during their lateral movement upon the pulleys.

I attain these objects by the means illustrated in the accompanying drawing in which—

Figure 1 is a side elevation of a band-blade slicing machine, with one form of my apparatus mounted thereon;

Figure 2 is a rear elevation of the machine with the same form of spacing apparatus mounted thereon, but with the ends of the guide fingers omitted for clearness;

Figure 3 is an enlarged detail in section on the line 3—3 of Figure 2;

Figure 4 is a detail view of an alternate means for retracting the movable members, employing a compression spring to retract them;

Figure 5 is an enlarged detail of the shaft in section and shows a side view of one of the spacing members or units mounted thereon;

Figure 6 is an enlarged detail plan view of a part of the lower series of spacing members, with slotted fingers secured therein in section on the line 6—6 of Figure 5;

Figures 7 and 7a show side and end views of one of the spacing rings, with pin for securing same to its shaft;

Figures 8 and 8a show edge and side elevations of one of the steel washers or separators.

Similar numerals refer to similar parts throughout the several views.

In order to accomplish the change of position of the blades lengthwise of the pulleys, and to do it smoothly, and to avoid adjacent blades coming in contact with each other and causing breakage or damage to the cutting edges of the blades, it is necessary to provide means which will cause the travel of all of the blades to take place simultaneously and which will prevent any one blade moving faster or farther than any blade adjacent thereto. To be sure that such travel of the blades occurs simultaneously as well as uniformly, it is necessary to provide positively driven means for actuating the blade guides and to avoid the irregularity of movement which may be produced by the springs or other resilient means heretofore inserted between the successive blade guides to exert pressure thereon in opposite directions.

When such springs are used intermediate the successive guide members of an entire series, and the movement of the entire series is accomplished in one direction by exerting pressure upon both ends of the series toward the middle and in the other direction by the springs inserted between the adjacent guide members, it is obvious that, when pressure is exerted upon the opposite ends of the series toward the middle, the movement of the guide members will be successive and not simultaneous; that is, the movable end member, where only one end is movable, will be moved toward the rigid end member and by pressure upon the adjoining member, will cause such adjoining member to move. Thus the pressure and movement will begin at one end and travel through the entire series; and, while the ultimate result may be and if the springs are properly proportioned will be to space the various members in the series uniformly, this spacing will not take place simultaneously. A similar situation occurs where the middle member of any group is rigidly fixed to the shaft and the members from both ends move toward the middle when the spacing is contracted and travel away from the middle when it is expanded.

It is one of the objects of my invention to avoid this irregular movement of the spring actuated guide members by using positively driven threaded means to actuate all of the guide members simultaneously so that whether moving in a direction to contract or to expand the spacing of the guide members, they will all move simultaneously as well as uniformly and any irregularity of movement will be overcome by the positive driving action of the threaded spacing rings and supporting members hereafter described.

In some of the claims I use the term "positively" to mean that the adjusting movement of the blade guide members and the force producing such movement are in the direct control of the operator and are caused or controlled by him directly without the intervention or use of springs between the guide members or any power applied automatically between the guide members without the operator's control. This meaning applies to the use of this term in connection with the adjusting movement of the individual guide members of either set and either toward or away from each other. It applies also to the forms shown in both Figures 2 and 4. The term "positively" is thus used to clearly limit and differentiate the apparatus claimed from the guides actuated in one direction by intermediate springs as shown in applicant's Patent No. 2,110,290, and the reasons requiring such positively actuated guide members are set out in applicant's amendment dated June 9, 1939.

As applied to a bread slicing machine of the band-blade type, my invention comprises a threaded shaft, 16 or a pair of spaced shafts 16—18 revolvably mounted in the frame of a machine. Hubs 4 and 5 united to the frame may be utilized, having bores formed therein in which the shafts are revolvably mounted with projecting ends upon which hand wheels 15—17 may be secured to rotate the shafts 16 and 18.

Each shaft has a slot or groove, 30—32 cut therein extending lengthwise of the shaft. A suitable stop 4a may be mounted upon the shaft and secured by a pin or other suitable means.

Upon each shaft I mount a plurality of spacing rings 28 each of which is provided with a central bore 28' fitting smoothly upon the shaft and enabling it to slide longitudinally thereon freely. Each spacing ring has means, such as a pin 35, united thereto, the inner end of which fits in and is slidable in the groove 30—32 of the shaft and prevents the rotation of the spacing ring relative to the shaft.

The periphery of each spacing ring is threaded with a relatively fine thread 28'' (preferably of a gauge permitting 24 to 48 threads per lineal inch of the shaft).

Upon the shafts 16—18 respectively I mount a series of supporting members 27—27' each of which has a central bore of a diameter corresponding to the diameter of the spacing rings 28. These bores are provided with internal threads 28''' (Figure 6) which are complementary to the external threads 28'' of the spacing rings 28 and designed to mesh therewith.

The supporting members and spacing rings may be of any desired length or thickness, as shown in Figure 8, and of such proportions that when the spacing rings are entirely screwed into their corresponding supporting members, the blade guides will hold the blades about three-eighths of an inch apart and when the rings are unscrewed to the full distance permitted by the stops, the guides will hold the blades about half an inch apart. In common practice the most desired thicknesses for slices of bread have been found to run within these limits.

In assembling each series of guides, each spacing ring is screwed just half way into the bores of one of the supporting members before being placed upon the shafts 16—18 and when so assembled, it is obvious that when the shafts are turned in one direction, the rings 28 will be screwed into the supporting members 27—27' so as to permit each series of supporting members to be contracted.

In order to permit the spacing rings to force the supporting members apart when the shafts 16—18 are turned in the opposite direction, I mount between one end of each spacing ring and the supporting member adjacent thereto, a washer 36, which may be of thin steel or other suitable material. These washers are provided with bores 37 which permit them to slide freely upon the shafts 16—18, but are too small to permit the spacing rings 28 to enter them. Thus the free end of each spacing ring abuts against the washer adjacent thereto while its opposite end is screwed into the next succeeding supporting member.

When proportioned as above described, the threaded portions of the rings in contact with the supporting members, in combination with the washers, will afford a firm support for the supporting members and the guide fingers united thereto.

I use the term "ends" as applied to the spacing rings to designate the flat surfaces thereof. The outermost supporting member of each series may bear against the block 24 or 25 or against the spring 37a, and the innermost supporting member of each series may be held stationary and kept in fixed position by the hubs 4 or 5 or the stops 4a.

In order to prevent rotation of the supporting members 27—27' upon the shafts carrying them, I prefer to form integral with each supporting member an extension 27'', which has a bore 27a formed therein adapting it to be mounted and to slide freely upon a non-rotatable shaft 19—19' one end of which may be secured in the hubs 4—5 so as to extend transversely of the machine parallel to the shaft 18.

The outer end of the shaft 18 may be provided with threads of about one inch pitch for each inch in diameter of the shaft, and an internally threaded sleeve or block mounted upon the threaded end formed with an extension to embrace and slide upon the shaft 19' or the sleeve may be provided with a handle and manually operated by said handle.

In Figure 2 is shown a sleeve 25 provided with a beveled face which bears against a stop-block 22' having a beveled flange 22 united thereto which corresponds to the beveled face 33 of the sleeve 25. The sleeve 25 is provided with an extension 27'' corresponding to the extensions of the supporting members and likewise slidably mounted upon the shaft 19.

Each supporting member 27—27' has united thereto a slotted member 31' adapted to contact the blades by means of a slot 14'—14'' formed therein, and to space the blades of each series to correspond with the spacing of the supporting members.

In Figures 1, 5, etc., I have shown such guiding members in the form of slotted fingers, but it is obvious that any desired form of guide may be united thereto or the supporting members themselves may be sufficiently enlarged to contact the blades and may be slotted to receive them.

It will be noted that with the forms shown in Figure 2, the end sleeves or blocks, 24 and 25 travel along the shaft whenever it is rotated by the handwheel 15 a distance equal to the sum of the distances of the travel of all of the spacing members upon that particular shaft and that this movement is automatic in both directions.

Another form for automatically retracting the spacing members is shown in Figure 4 and consists of a spring 37a mounted upon the end of the shaft 18 one end of which bears against a pin 38 and the other end of which bears against and exerts pressure upon the adjacent spacing member 27'. This spring must be of sufficient strength and length to cause the spacing members to travel the necessary distance to take up any slack that might be left between the spacing members when the shaft is so turned as to cause the spacing rings to be turned so as to re-enter, more or less, the supporting members.

In order to synchronize the spacing of the spacing members upon both the upper and lower shafts, any of the means of so doing in common use for similar purposes may be utilized, one form of which is shown in my application Serial No. 171,866, filed October 30, 1937, and upon which Patent No. 2,126,987 issued August 16, 1938.

In the operation of my invention, the apparatus embodying it is first assembled by inserting the pins 35 in the respective spacing rings, 28 and then screwing the spacing rings 28 into their corresponding spacing members 27 until the edges coincide. The spacing members 27 with the spacing rings inside of them are then slid upon the shaft 18 with the pins 35 projecting into the groove 32 and at the same time the extensions 27" are slid onto the corresponding shaft 19'.

Between the successive spacing members, the flat steel washers 36 are inserted and slid upon the shaft 18.

The sleeve 24 is likewise mounted upon the shaft 18 and secured in its desired position, and the extensions 27" are then slid upon the end of the shaft 19'.

The shafts 18 and 19' are then inserted in the corresponding bores in the hub 5 and the handwheel 17 is secured upon the end of the shaft 18 and the shaft 19' secured in place by a pin.

The cutting blades 14 are then mounted upon the pulleys 8 and 9 in crossed or figure 8 form and the blades inserted in the slots of the fingers 31 and 31'. The blades are then tightened by the eccentric 12 and the machine is then ready to start.

The pulleys 8 and 9 are cylindrical in form and of uniform diameter throughout the entire length utilized to drive or carry the blades. With the pulleys so formed and when arranged as described, the lateral pressure of the guides upon the cutting courses of the blades will not only act to guide the blades in the desired position throughout their cutting courses, but will also cause them to travel on the pulleys 8 and 9 to distances corresponding to the movement of the blade guides. This movement of the blades upon the pulleys 8 and 9 may be accomplished while the machine is running and without loosening the blades, but can be accomplished with a little less strain on the blades by loosening or reducing the tension on the blades by the eccentric 12 and the handle 13 sufficiently to facilitate the blade movement on the pulleys.

After the blades have made the desired movement, the tension of the blades can again be brought to normal by the eccentric 12 and its handle 13.

It is obvious that various modifications of the apparatus shown may be made without departing from the spirit of my invention and I do not limit my claims to the precise forms shown and described herein.

I claim:

1. In a bread slicing machine, the combination with a plurality of crossed band saws, of supporting and driving pulleys therefor, sets of saw guide-members disposed intermediate said pulleys to coact with the reaches of the crossed saws at opposite sides of their slicing zones and adjacent thereto and comprising fingers slotted to receive the saws, means for positively, simultaneously and uniformly adjusting said saw guide-members laterally toward or away from each other while the pulleys are in rapid motion, said pulleys being common to the several saws and the saw supporting surfaces thereof being of uniform diameter from end to end whereby said saws automatically adjust themselves thereon with the adjustment of said saw guide-members, and guiding means for the bread to be sliced whereby it is presented to said saws between the said sets of saw guide-members.

2. In a bread slicing machine, the combination with a plurality of crossed band saws, of supporting and driving pulleys therefor, spaced sets of saw guide-members disposed intermediate said pulleys to coact with the reaches of the crossed saws at opposite sides of their slicing zones and adjacent thereto and comprising fingers slotted to receive, guide, space, and, to a limited extent, twist the saws, and means for positively, simultaneously and uniformly adjusting said saw guide-members of a given set laterally toward or away from each other while the pulleys are revolving, said pulleys being common to the several saws and the saw supporting surfaces thereof being of uniform diameter from end to end whereby said saws automatically adjust themselves thereon with the adjustment of said saw guide-members.

3. In a bread slicing machine, the combination with a plurality of crossed band saws, of supporting and driving pulleys therefor, spaced sets of saw guide-members disposed intermediate said pulleys to coact with the reaches of the crossed saws, and means for positively and simultaneously and uniformly adjusting said saw guide members to and from each other while the pulleys are revolving, said pulleys being common to the several saws and the saw supporting surfaces thereof being of uniform dimensions from end to end whereby said saws automatically adjust themselves thereon with the adjustment of the saw guide-members.

4. In a bread slicing machine, the combination with a plurality of band saws, of supporting and driving pulleys therefor, saw guide members disposed intermediate said pulleys to coact with the reaches of the saws at points substantially spaced from their pulleys and comprising fingers slotted to receive the saws, and means for positively and simultaneously and uniformly adjusting said saw guide-members to and from each other while the pulleys are revolving, said pulleys being common to the several saws and the saw supporting surfaces thereof being of uniform diameter from end to end whereby said saws automatically adjust themselves thereon with the adjustment of said saw guide-members.

5. In a bread slicing machine, the combination with a pair of spaced supporting and driving pulleys, of band-blade slicing means mounted thereon having a plurality of spaced parallel cutting courses crossing intermediate the driving pulleys, spaced sets of blade guide-members disposed intermediate said pulleys to coact with the said cutting courses at opposite sides of their crossing zone and adjacent thereto, comprising means to receive and twist within certain limits the blade courses severally, means for positively simultaneously and uniformly adjusting said blade guide-members toward and away from each other while the pulleys are revolving, said pulleys being common to the several blade reaches and the blade supporting surfaces of said pulleys being cylindrical and of uniform diameter from end to end whereby said blade reaches automatically adjust themselves upon the pulleys upon the adjustment of said blade guide-members, and guiding means for the bread to be sliced whereby it is presented to said cutting courses between the sets of blade guide-members.

6. In a bread slicing machine, the combination with a pair of spaced supporting and driving pulleys, of band-blade slicing means mounted thereon having a plurality of spaced parallel cutting courses crossing intermediate the driving pulleys, sets of blade guide-members disposed intermediate said pulleys to coact with the said cutting courses at opposite sides of their crossing zone and adjacent thereto, comprising fingers slotted to receive and guide the blade courses severally, and means for positively simultaneously and uniformly adjusting said blade guide-members toward and away from each other, said pulleys being common to the several blade reaches and the blade supporting surfaces of said pulleys being cylindrical and of uniform diameter from end to end whereby said blade reaches automatically adjust themselves upon the pulleys upon the adjustment of said blade guide-members.

7. In a bread slicing machine, the combination with a pair of spaced supporting and driving pulleys, of band-blade slicing means mounted thereon having a plurality of spaced parallel cutting courses crossing intermediate the driving pulleys, sets of blade guide-members disposed intermediate said pulleys to coact with the said cutting courses at opposite sides of their crossing zone and adjacent thereto, comprising fingers slotted to receive and guide the blade courses severally, means for positively simultaneously and uniformly adjusting said blade guide-members toward and away from each other, said pulleys being common to the several blade reaches and the blade supporting surfaces of said pulleys being cylindrical and of uniform diameter from end to end whereby said blade reaches automatically adjust themselves upon the pulleys upon the adjustment of said blade guide-members when the pulleys are in motion, and means to spread the pulleys to increase the blade tension and to draw them nearer together to reduce the blade tension so as to facilitate blade adjustment thereon as the sets of guide-members are retracted or expanded.

8. In a bread slicing machine, the combination with a pair of spaced supporting and driving pulleys, of band-blade slicing means mounted thereon having a plurality of spaced parallel cutting courses crossing intermediate said pulleys sets of blade guide-members disposed intermediate said pulleys to coact with the said cutting courses and guide the blades therein, and means for positively simultaneously and uniformly adjusting said blade guide-members toward and away from each other, said pulleys being common to the several blade reaches and the blade supporting surfaces of said pulleys being cylindrical and of uniform diameter from end to end whereby said blade reaches automatically adjust themselves upon the pulleys upon the adjustment of said blade guide-members while the pulleys are revolving.

9. In a bread slicing machine, the combination with a pair of spaced supporting and driving pulleys, of band-blade slicing means mounted thereon having a plurality of spaced parallel cutting courses crossing intermediate said pulleys sets of blade guide-members disposed intermediate said pulleys to coact with the said cutting courses at points substantially spaced from the pulleys and comprising fingers slotted to receive and guide the blade courses severally, and means for positively simultaneously and uniformly adjusting said blade guide-members toward and away from each other while the pulleys are revolving, said pulleys being common to the several blade reaches and the blade supporting surfaces of said pulleys being cylindrical and of uniform diameter from end to end whereby said blade reaches automatically adjust themselves upon the pulleys upon the adjustment of said blade guide-members.

10. In a bread slicing machine, the combination with a pair of spaced supporting and driving pulleys, of band-blade slicing means mounted thereon having a plurality of spaced parallel cutting courses crossing intermediate said pulleys sets of blade guide-members disposed intermediate said pulleys to coact with the said blade cutting courses at opposite sides of their crossing zone and adjacent thereto, comprising fingers slotted to receive and guide the blade courses severally, means for positively and simultaneously and uniformly adjusting said blade guide-members toward and away from each other, said pulleys being common to the several blade reaches and the blade supporting surfaces of said pulleys being cylindrical and of uniform dimension from end to end whereby said blade reaches automatically adjust themselves thereon with the adjustment of said blade guide members while the pulleys are revolving, and guiding means for the bread to be sliced whereby it is presented to said blades between the sets of blade guide-members.

11. In a bread slicing machine, the combination with a pair of spaced supporting and driving pulleys, of band-blade slicing means mounted thereon having a plurality of spaced parallel cutting courses crossing intermediate the driving pulleys, sets of blade guide-members disposed intermediate said pulleys to coact with the said blade cutting courses at opposite sides of their crossing zone and adjacent thereto, comprising means to receive and guide the blades in their cutting courses severally, and means for positively and simultaneously and uniformly adjusting said blade guide-members toward and away from each other, said pulleys being common to the several blade reaches and the blade supporting surfaces of said pulleys being smooth, regular, and of uniform dimension from end to end whereby said blade reaches automatically adjust themselves thereon with the adjustment of said blade guide-members while the blades are in motion.

12. In a bread slicing machine, the combination with a pair of spaced supporting and driving pulleys, of band-blade slicing means mounted thereon having a plurality of spaced parallel cutting courses crossing intermediate the driving pulleys, sets of blade guide members disposed intermediate said pulleys to coact with the said blade cutting courses, and means for positively and simultaneously and uniformly adjusting said blade guide-members toward and away from each other, said pulleys being common to the several blade reaches and the blade supporting surfaces of said pulleys being cylindrical and of uniform dimension from end to end whereby said blade reaches automatically adjust themselves thereon with the adjustment of said blade guide-members.

13. In a bread-slicing machine, the combination with a pair of spaced supporting and driving pulleys, of band-blade slicing means mounted thereon having a plurality of spaced parallel cutting courses crossing intermediate the driving pulleys, spaced sets of blade guide-members disposed intermediate said pulleys to coact with the said blade cutting courses at points substantially spaced from the pulleys and comprising fingers slotted to receive the blade courses severally, and means for positively and simultaneously and uniformly adjusting said blade guide-members of either set toward or away from each other, said pulleys being common to the several blade reaches and the blade supporting surfaces of said pulleys being cylindrical and of uniform dimension from end to end whereby the moving blades automatically adjust themselves thereon in correspondence with the adjustment of said blade guide-members.

14. In a bread slicing machine, the combination with a pair of spaced supporting and driving pulleys, of band-blade slicing means mounted thereon having a plurality of spaced parallel cutting courses crossing intermediate the driving pulleys, sets of blade guide-members disposed intermediate said pulleys to coact with the said blade cutting courses at opposite sides of their crossing zone and adjacent thereto, comprising fingers slotted to receive the blade courses severally, means for positively and simultaneously and uniformly adjusting said blade guide-members of either set toward and away from each other while the blades are in motion, said pulleys being common to the several blade reaches and the blade supporting surfaces of said pulleys being cylindrical and of uniform dimension from end to end whereby said blade reaches automatically adjust themselves thereon with the adjustment of said blade guide-members, and means to spread the pulleys to increase the blade tension and to draw them nearer together to reduce the blade tension so as to facilitate blade adjustment thereon as the sets of guide-members are retracted or expanded.

15. In a bread slicing machine, the combination with a pair of spaced supporting and driving pulleys, of band-blade slicing means mounted thereon having a plurality of spaced parallel cutting courses crossing intermediate the driving pulleys, sets of blade guide-members disposed intermediate said pulleys to coact with the said cutting courses at opposite sides of their crossing zone and adjacent thereto, comprising means to bear against opposite sides of the blades severally, means for positively and simultaneously and uniformly adjusting said blade guide-members toward and away from each other, said pulleys being common to the several blade reaches and the blade supporting surfaces of said pulleys being cylindrical and of uniform dimension from end to end whereby said blade reaches automatically adjust themselves thereon with the adjustment of said blade guide-members, and means to increase or to decrease the tension of the blade cutting courses.

16. In a bread slicing machine, the combination with a pair of spaced supporting and driving pulleys, of band-blade slicing means mounted thereon having a plurality of spaced parallel cutting courses crossing intermediate the driving pulleys, sets of blade guide-members disposed intermediate said pulleys to coact with the said cutting courses at opposite sides of their crossing zone and adjacent thereto and to guide the blades therein, comprising means to bear against opposite sides of the blades severally, means for positively simultaneously and uniformly adjusting said blade guide-members toward and away from each other, said pulleys being common to the several blade reaches and the blade supporting surfaces of said pulleys being cylindrical and of uniform diameter from end to end whereby said blade reaches automatically adjust themselves upon the pulleys upon the adjustment of said blade guide-members, and means to tighten or loosen the blades on the driving pulleys.

17. In a bread slicing machine of the band-blade type, the combination with a plurality of crossed band-blades arranged in figure 8 form, of supporting and driving pulleys therefor, spaced sets of blade guide members adjustably disposed intermediate said pulleys to co-act with the oppositely moving reaches of the crossed band-blades at opposite sides of their crossing zone and spaced therefrom and comprising fingers to space and, to a limited extent, twist the blades, means for positively, simultaneously and uniformly laterally adjusting said blade guide members of either set toward or away from each other, said pulleys being common to the several blades and the blade supporting surfaces thereof being smooth and regular and of uniform diameter from end to end whereby the lateral adjustment of said blade guide members while the pulleys are in motion will automatically cause the blades to correspondingly adjust themselves upon the pulleys, and guiding means for the bread to be sliced whereby it is presented to said blades between the said sets of blade guide members.

18. In a bread slicing machine of the band-blade type, the combination with a plurality of crossed band-blades arranged in figure 8 form, of supporting and driving pulleys therefor, spaced sets of blade guide members adjustably disposed intermediate said pulleys to co-act with the oppositely moving reaches of the crossed band-blades at opposite sides of their crossing zone and spaced therefrom and comprising fingers to space and, to a limited extent, twist the blades, and means for positively, simultaneously and uniformly laterally adjusting said blade guide members of either set toward or away from each other, said pulleys being common to the several blades and the blade supporting surfaces thereof being smooth and regular and of uniform diameter from end to end whereby the lateral adjustment of said blade guide members while the pulleys are in motion will automatically cause the blades to correspondingly adjust themselves upon the pulleys.

19. In a bread slicing machine of the band-blade type, the combination with a plurality of band-blades arranged in figure 8 form, of supporting and driving pulleys therefor, spaced sets of blade guide members adjustably disposed intermediate said pulleys to coact with the oppositely moving reaches of the crossed band-blades, and means for positively, simultaneously and uniformly laterally adjusting said blade guide members either toward or away from each other, said pulleys being common to the several blades and the blade supporting surfaces thereof being smooth and regular and of uniform dimensions from end to end whereby the lateral adjustment of said blade guide members while the pulleys are in motion will automatically cause the blades to correspondingly adjust themselves upon the pulleys.

20. In a bread slicing machine of the band-blade type, the combination with a plurality of band-blades arranged in figure 8 form, of supporting and driving pulleys therefor, blade guide members adjustably disposed intermediate said pulleys to co-act with the oppositely moving reaches of the band-blades at points substantially spaced from their pulleys and comprising fingers to space and, to a limited extent, twist the blades, and means for positively, simultaneously and uniformly laterally adjusting said blade guide members of either set toward or away from each other, said pulleys being common to the several blades and the blade supporting surfaces thereof being smooth and regular and of uniform diameter from end to end whereby the lateral adjustment of said blade guide members while the pulleys are in motion will automatically cause the blades to correspondingly adjust themselves upon the pulleys.

HARRY J. CRINER.